UNITED STATES PATENT OFFICE.

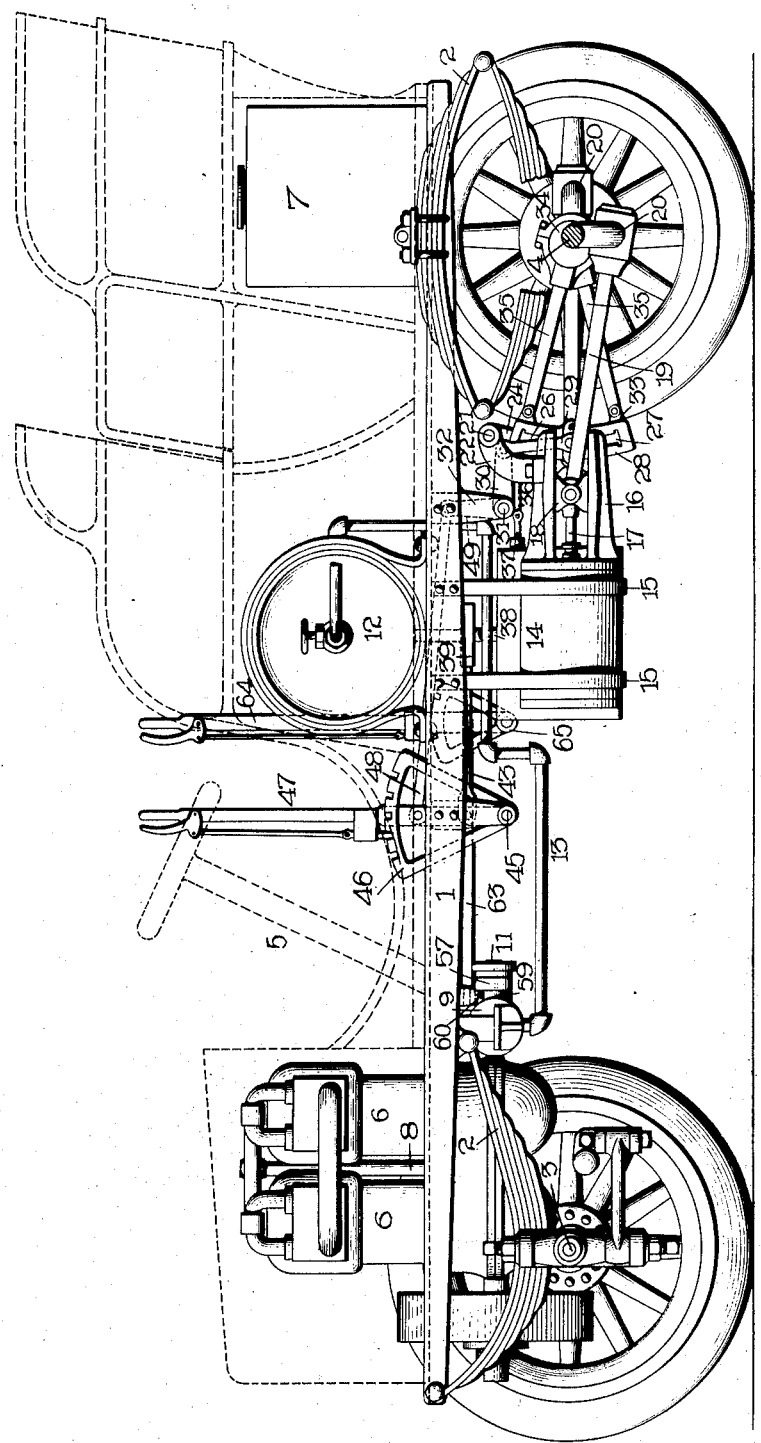

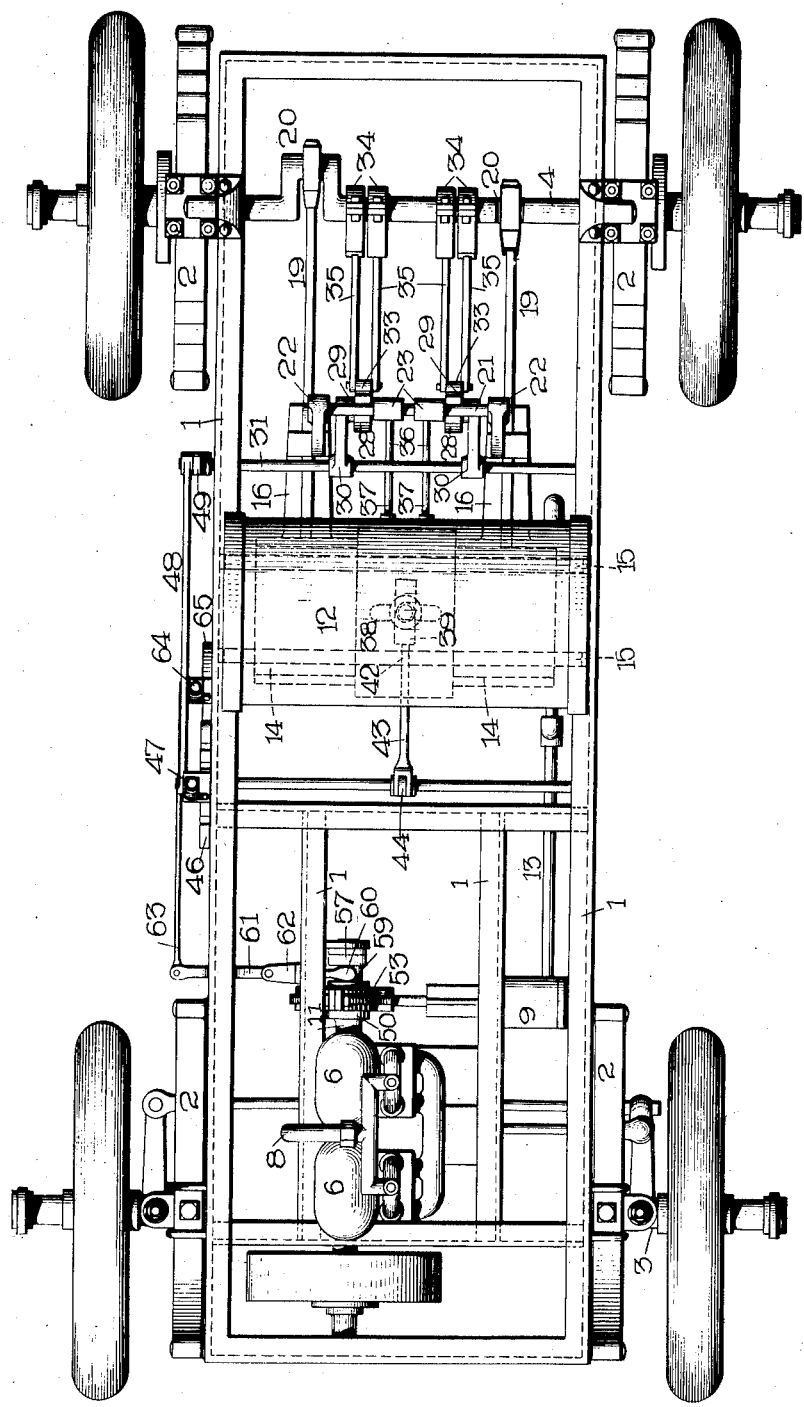

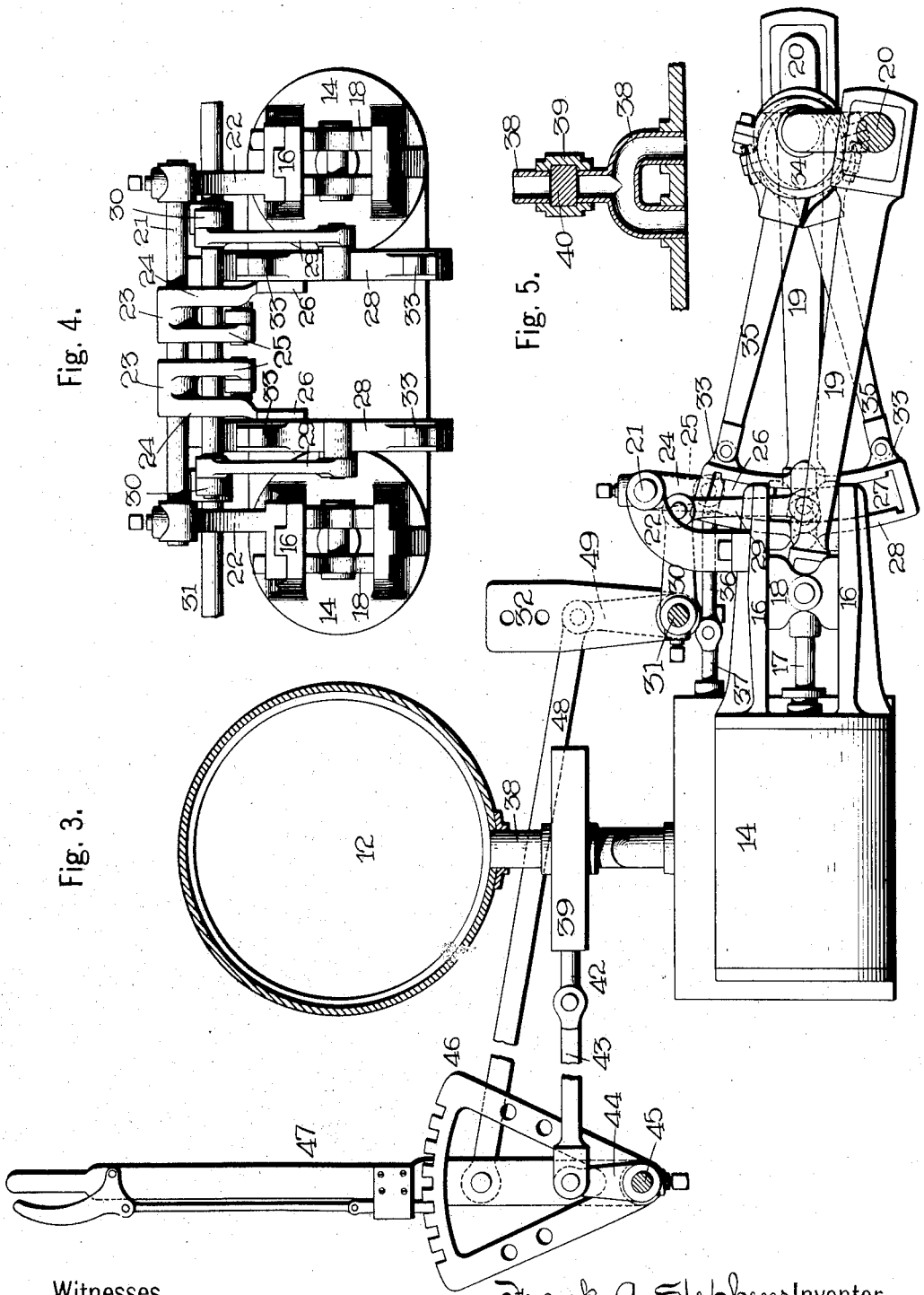

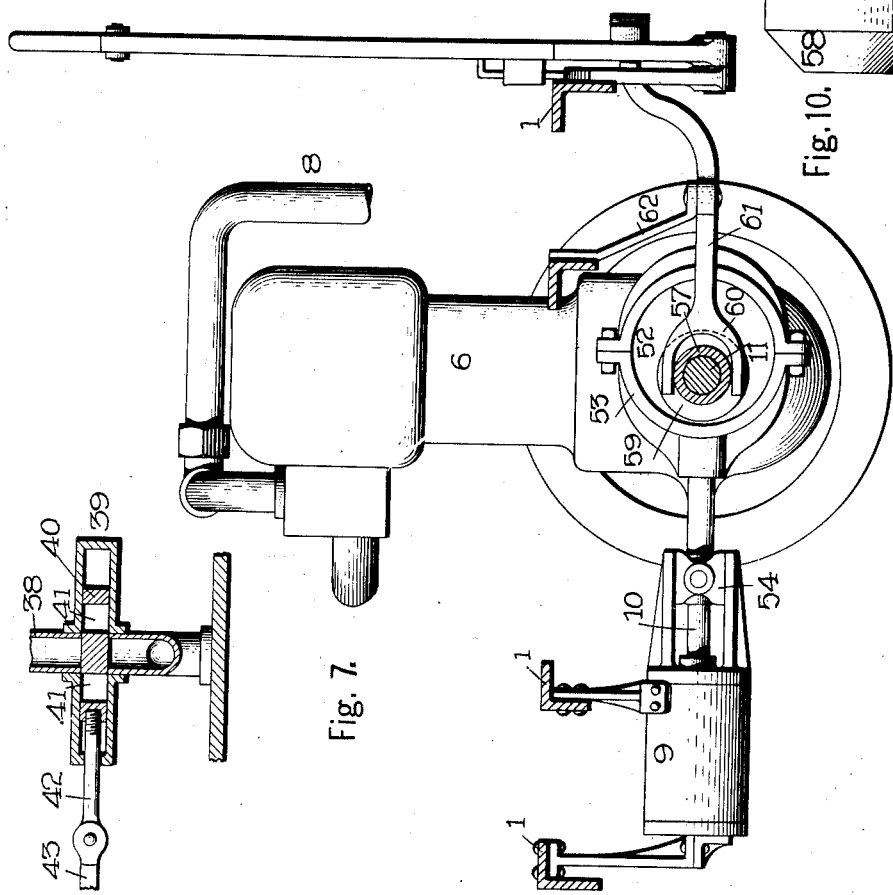

FRANK A. STEPHENS, OF DUNKIRK, NEW YORK.

AUTOMOBILE.

No. 901,493.　　　Specification of Letters Patent.　　　Patented Oct. 20, 1908.

Application filed December 9, 1904. Serial No. 236,148.

*To all whom it may concern:*

Be it known that I, FRANK A. STEPHENS, a citizen of the United States, residing at Dunkirk, in the county of Chautauqua and State of New York, have invented certain new and useful Improvements in Automobiles, of which the following is a specification.

This invention relates to an improved automobile and principally to certain novel features in the operating mechanism thereof.

The principal objects of the invention are to enable the gasolene engine to be driven at a uniform speed at all times to dispense with transmission and speed changing gears and to drive the automobile by an engine which is connected directly to the driving axle and driven by power derived from the gasolene engine.

The invention also relates to certain details of construction, all of which will be fully and clearly hereinafter described and claimed, reference being had to the accompanying drawings in which a preferred adaptation of the invention is shown.

Figure 1 is a side elevation of the running gear of an automobile equipped with the improved driving mechanism, the body and hood being shown in dotted lines, and two of the wheels being removed to clearly show the mechanism. Fig. 2 is a top plan view of the automobile with the body, the hood and fuel storage or gasolene tank removed. Fig. 3 is an enlarged detached side elevation of the improved driving mechanism, a section being cut through one of the cranks on the driving axle, and through the compressed air reservoir. Fig. 4 is a detached rear view of the air engine and the mechanism attached thereto, the connecting rods being omitted and the eccentric rods of the valve gear detached from the links and omitted. Fig. 5 is a detached section through the throttle valve. Fig. 6 is a detached longitudinal section through the throttle valve. Fig. 7 is an enlarged detached rear elevation of the gas engine, and the air compressor, a section being taken through the automobile frame and through the sliding member of the friction clutch and the shaft of the gas engine. Fig. 8 is a section through the eccentric for operating the air compressor and through the friction clutch device, a fragment of the shaft of the gas engine being shown. Fig. 9 is an enlarged detached side view of the eccentric. Fig. 10 is an enlarged detached side view of the movable member of the friction clutch.

In referring to the adaptation of the invention shown in the accompanying drawings in detail, like numerals designate like parts.

The automobile consists of the usual frame 1, springs 2, front and rear axles 3 and 4, steering device 5, and a body which is shown in dotted lines in Fig. 1.

The driving mechanism in the adaptation shown consists of a gasolene engine 6, which is preferably mounted on the front end of the frame 1, and inclosed within the usual hood shown in dotted lines in Fig. 1. The gasolene engine 6, is supplied with gasolene from a tank 7, of the usual type which in this instance is located under the rear seat and connected to the gasolene engine by piping 8. An air pump 9, has its piston rod 10, connected by friction mechanism to the driving shaft 11, of the gasolene engine and an air reservoir or tank 12, for the storing of compressed air is located at any convenient point of the automobile, (in the present adaptation being arranged under the front seat thereof) and connected by a pipe 13, to the air pump. By employing friction mechanism to connect the air pump to the gasolene engine, all danger of an explosion of the tank 12, from excessive pressure is avoided, as the friction mechanism will slip when the pressure reaches a certain point.

An atmospheric or air engine is mounted on the automobile and is driven by compressed air supplied from the reservoir 12. This atmospheric engine is preferably of a reciprocating double cylinder type with the cylinders disposed horizontally and the piston rods connected directly to the driving axle of the automobile and on the quarter to absolutely prevent any possibility of a dead center.

The atmospheric engine consists of a pair of parallel horizontal cylinders 14, which are supported from the frame by metal straps 15, cross head guides 16, the usual piston rods 17, having cross heads 18, slidably mounted in the cross head guides 16, and connecting rods 19, pivoted at one extremity to the cross head, and at the opposite end to the cranks 20, of the driving axle 4, of the automobile. The rods 19, are connected to the cranks 20, on the quarter as the cranks extend substantially at right angles to each other which obviates any danger of the engine ever being on a dead center. A transversely extending bar 21, is mounted in brackets 22, see Figs. 3 and 4, and two sleeves 23, are loosely mounted upon the bar, each sleeve having two depending arms 24 and 25, formed integrally therewith. Each of the arms 24, has a block 26, formed at its lower end, the block 26, fitting in a curved slot 27, which is formed in a curved link 28. Each link 28, is supported by a connecting arm 29, from the end of a crank arm 30, which is mounted on a horizontally extending rock shaft 31. The rock shaft 31, is supported in brackets 32, secured to the frame of the automobile as shown in Fig. 1. Lugs 33, are formed upon the rear surface or edge of the links 28, and near the upper and lower ends thereof. A plurality of eccentrics 34, are mounted upon the driving axle 4, and each eccentric has a forwardly extending eccentric rod 35, the forward extreme of which is pivoted by a pin to one of the lugs 33, on the links 28, see Fig. 3. The depending arms 25, are connected by connecting rods 36, to valve rods 37, which are slidably mounted in the valve chamber of the air engine, see Fig. 3, and which govern the admission of air into the cylinders.

The supply of air to the valve chamber of the engine is controlled by a throttle valve which is operated by a lever placed in convenient reach of the chauffeur and which also varies the lead of the valve and reverses the stroke of the engine. The throttle valve is mounted on the pipe 38, which conveys the air from the air reservoir 12, to the air engine, and consists of a rectangular casing 39, in which is mounted a slidable block 40. This block is provided with two vertical openings 41, one being located near each end thereof. A stem or rod 42, projects from one end of the block 40, and extends through the casing 39, and a connecting rod 43, is pivoted at its rear end to this stem 42, and at its forward end to a vertical crank arm 44. The crank arm is mounted on a horizontal rock shaft 45, which is mounted in bearings depending from the automobile frame. One of the bearings is in the form of a quadrant 46, and a vertically extending controlling lever 47, has its lower end secured to the rock shaft and adjacent to the quadrant. The lever 47, may be moved forward or backward to open or close the throttle valve, the lever being held in position by the usual pin which fits in notches formed in the quadrant, see Fig. 3. A connecting rod 48, is pivoted at its forward end to the controlling lever 47, and at its rear end to a vertical crank arm 49, which is mounted at one end of the rock shaft 31.

The operation of this portion of the mechanism is as follows: When the controlling lever is in its central position as shown in Fig. 3, the throttle valve is closed and no air is admitted to the valve chambers of the engine. A forward movement of the lever 47, opens the throttle valve and the air passes into the valve chambers of the engine and thence into the cylinders. The air operates the pistons and by means of the piston rods 17, connecting rods 19, and cranks 20, rotates the driving axle 4. The rotation of the driving axle 4, gives a reciprocating movement to the links 28, by means of the eccentrics 34 and eccentric rods 35. This movement is transmitted to the valve by means of the block 26, arms 24, sleeves 23, arms 25, connecting rods 36 and valve rods 37. The same forward movement of the lever 47, regulates the lead of the valves in the valve chambers by changing the position of the links 28. A movement of the lever 47, from its forward position to a position back of its center first closes the throttle valve, then opens it again, and by again changing the position of the links 28, reverses the direction of the stroke of the engine.

The friction mechanism for operating the air pump 9, is illustrated in Figs. 1, 2, 7, 8, 9 and 10. The shaft 11, of the gasolene engine has an enlargement 50, formed near one end, the enlargement having its outer face beveled as shown at 51, in Fig. 8, and forms one member of the friction clutch. An eccentric 52, is loosely mounted upon the shaft 11, in proximity to the enlargement 50, and said eccentric is surrounded by a strap 53. An eccentric rod has one end pivoted to the cross head 54, of the air pump and its other end secured to the strap 53. The eccentric 52, has an opening 55, through which the shaft 11, passes, and two circular depressions 56, are formed in the side faces of the eccentrics, the depressions being formed around the opening 55, and having beveled walls. A collar 57, is loosely mounted upon the end of the shaft 11, and has one of its ends provided with a beveled edge 58, which is adapted to seat in one of the depressions 56, in the eccentric. The collar 57, forms the movable member of the friction clutch and has a peripheral groove 59, in which a yoke or fork 60, formed at one end of a lever 61, is adapted to fit. The lever 61, is fulcrumed at an intermediate point upon a bracket 62, extending from the automobile frame and has its outer end pivoted to the forward end of a connecting rod 63, the rear end of which is connected to a vertical lever 64. This lever 64, is pivoted on a pin extending from the lower point of a quadrant 65, which is secured to the automobile frame. The lever 64, is within convenient reach of the chauffeur, and is locked in its adjusted position in a manner similar to the lever 47. A collar is fastened to the end of the engine shaft 11, to prevent the collar 57, from backing off the shaft.

The operation of this mechanism is as follows,—A rearward movement of the lever 64, moves the forked end of the lever 61, forward and moves the movable member forward, thereby gripping the eccentric 52, between the opposed beveled faces 51 and 58, of the members of the friction clutch, thereby locking the eccentric to the shaft 11, and operating the pump.

The great advantages of this invention are that the atmospheric engine can be connected directly to the driving axle of the automobile and driven at differing speeds, reversed, stopped or started by a single lever which controls the throttle valve of the atmospheric engine and also the cylinder valves, that the gasolene engine can be driven at a uniform speed and as it merely serves to provide power to operate the air pump or compressor it is not forced to its utmost capacity or operated irregularly or with differing speed power, which renders the engine longer lived and less liable to break down, that the friction created in the ordinary type in transmitting power from the high speed gasolene engine to the driving axle of the automobile is eliminated and in its place is simply the friction produced in operating the air pump from the gasolene engine and in operating the atmospheric engine.

The regularity of operation of the gasolene engine produces economy in consumption of gasolene and the application of a direct drive on the rear axle provides a better and quicker control of the automobile. The gasolene engine is run at a uniform speed while the speed of the atmospheric engine is varied to vary the speed of the automobile.

The compressed air reservoir may also be conveniently utilized to fill the pneumatic tires and to clean the car or person by providing a valve at either end of the air reservoir to which a tube of rubber or other flexible material is attached as shown in Fig. 1.

I claim as my invention.

1. In an automobile, the combination with the driving axle thereof, of a plurality of engines, a gasolene engine adapted to run at uniform speed, and an atmospheric engine adapted to be driven at differing speeds and connected directly to the driving axle of the automobile, an air pump for supplying compressed air to the atmospheric engine and friction mechanism operatively connecting the air pump to the gasolene engine and comprising a clutch member on the shaft of the gasolene engine, an eccentric loosely mounted on said gasolene engine shaft in proximity to said clutch member, an eccentric rod having one end pivoted to the air pump and its opposite end secured to the strap and a collar forming the other clutch member, substantially as set forth.

2. In an automobile, the combination with the frame and front and rear axles, of an atmospheric engine having two cylinders hung side by side beneath the frame in front of the rear driving axle and each having direct cranked connection to said driving axle, a compressed air tank having pipe connection to both cylinders of said atmospheric engine to supply compressed air thereto, an air pump supported beneath the frame in front of the atmospheric engine for replenishing the air in said tank, a gasolene engine mounted at the front end of the frame for operating said air pump and a throttle valve mechanism in the pipe connecting the air tank to the atmospheric engine and controlling the speed of both cylinders of the atmospheric engine.

3. In an automobile, the combination with the frame and the driving axle of an atmospheric engine connected directly to the driving axle and having a plurality of cylinders, a compressed air tank having pipe connection to all of the cylinders of said atmospheric engine to supply compressed air thereto, an air pump for replenishing the air in said tank, a gasolene engine for operating the air pump and a single throttle valve mechanism in the pipe connecting the air tank to the atmospheric engine for simultaneously and correspondingly varying the speed of all the cylinders of the atmospheric engine.

4. In an automobile, the combination with the driving axle thereof, of an air pump, a gasolene engine, friction mechanism connecting the gasolene engine to the air pump, a compressed air tank operatively connected to the air pump, an atmospheric engine connected to the driving axle, a throttle valve controlling the speed of the atmospheric engine, a lever within convenient reach of the operator controlling the throttle valve and a second lever also within convenient reach of the operator controlling the friction mechanism whereby the speed of both the air pump and the atmospheric engine may be instantly varied, substantially as set forth.

5. In an automobile, a compressed air reservoir, an atmospheric engine connected to the driving axle of the automobile and having a plurality of cylinders, a pipe connecting the atmospheric engine to the compressed air reservoir, a throttle valve in said pipe controlling the admission of compressed air to the atmospheric engine, cylinder valves controlling the admission of compressed air to the engine cylinders and an operating lever extending to within convenient reach of the operator and controlling both the throttle valve and the cylinder valves.

FRANK A. STEPHENS.

Witnesses:
L. M. SANGSTER,
GEO. A. NEUBAUER.